United States Patent Office 2,999,427
Patented Sept. 12, 1961

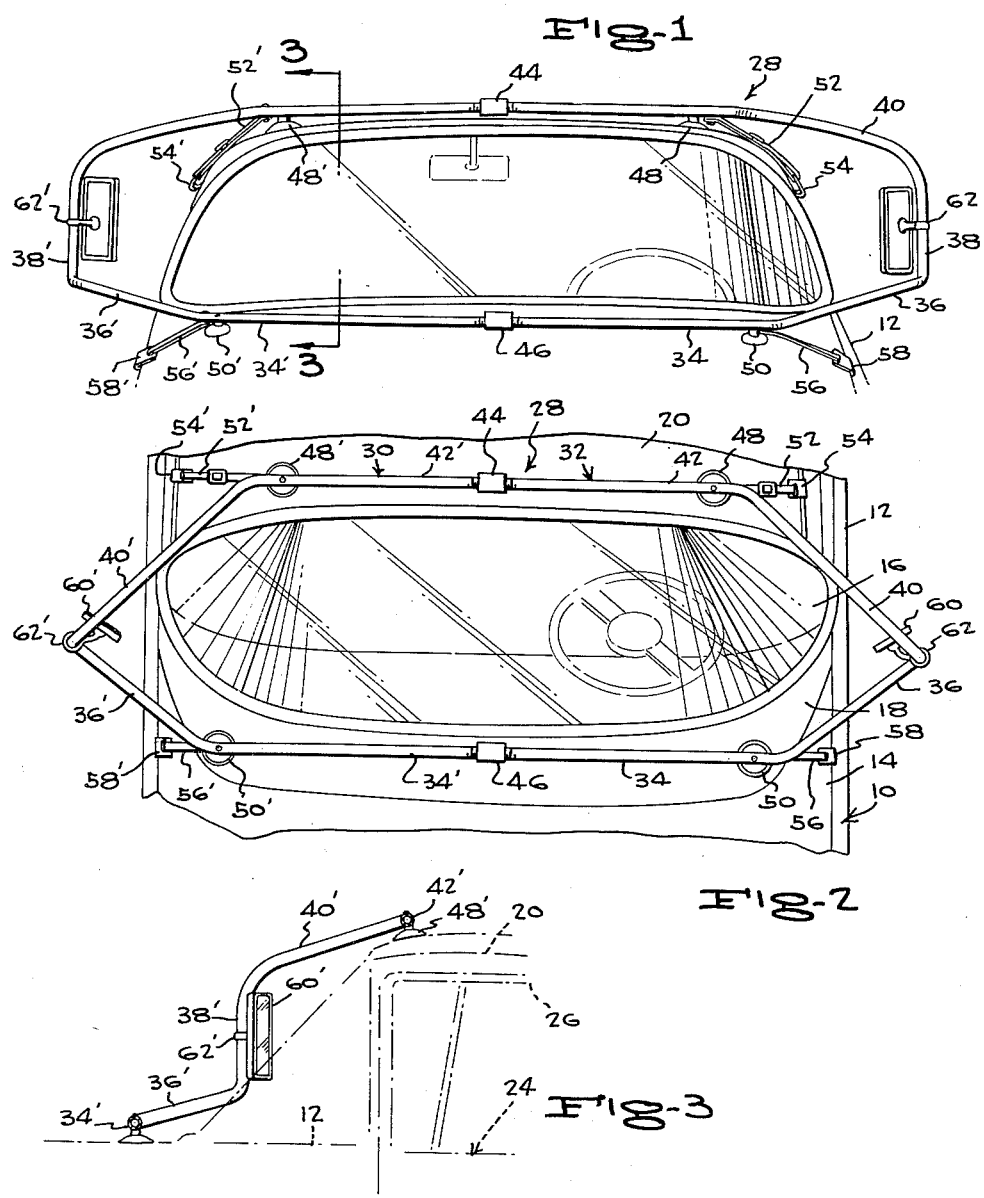

2,999,427
REAR VIEW MIRROR SUPPORTING FRAME
FOR AUTOMOBILES
Wilbur Fred Newcomb, 2129 Palomar Drive,
Ventura, Calif.
Filed Apr. 3, 1959, Ser. No. 804,025
4 Claims. (Cl. 88—86)

The instant invention pertains to reflecting devices and a supporting frame therefor and, more specifically, the instant invention pertains to a rear view mirror and support frame therefor adapted for connection to an automotive vehicle.

One of the primary objects of this invention is to provide a lateral support for rear view mirrors which project exteriorly of the vehicle.

Another object of this invention is to provide support means for rear view mirrors disposed at each side of and exteriorly of a car or automobile, the support being quickly connected to and disconnected from the automotive vehicle.

A still further object of this invention is to provide a support for externally mounted rear view mirrors at each side of the vehicle to provide the operator with means for estimating the condition of the traffic behind him during the towing of a trailer or other conveyance.

This invention contemplates, as a still further object thereof, the provision of a support for externally mounted rear view mirrors for automobiles, the support being non-complex in construction and assembly, inexpensive to manufacture, and durable in use.

Other and further objects and advantages of the instant invention will become more evident from a consideration of the following specification when read in conjunction with the annexed drawing, in which:

FIGURE 1 is a front elevational view of support means for rear view mirrors carried externally of an automotive vehicle, FIGURE 1 also illustrating the means of connection of the support to the vehicle;

FIGURE 2 is a top plan view of the support illustrated in FIGURE 1; and

FIGURE 3 is a cross-sectional view of the support, partly in elevation, FIGURE 3 being taken substantially on the vertical plane of line 3—3 of FIGURE 1, looking in the direction of the arrows.

Referring now more specifically to the drawing, reference numeral 10 designates, in general, a conventional automobile having a body 12, a hood 14, a windshield 16, a cowling 18 extending between the windshield 16 and the hood 14, a top 20, and a window frame 22 in a front door 24 including an upper frame member 26.

The rear view side mirror support means to which this invention is addressed is designated, in general, by reference numeral 28 and involves a pair of identical frame members 30, 32 each formed of a single hollow tubular conduit. Consequently, a description of one is a description of the other.

Selecting the frame member 32 for specific definition, counterparts found in the frame member 30 have been assigned the same reference numerals to which have been added a prime mark.

The frame member 32 is seen to comprise a normally horizontal arm 34 disposed below the windshield 16 and having a length substantially equal to one-half the width thereof. One end of the arm 34 continues into an extension member 36 which projects laterally and upwardly beyond one side of the body 12. The extension member 36 is integral with one end of a normally vertical standard 38 whose other end is integrally connected with one end of a riser 40 that extends upwardly and inwardly towards the top 20. The other end of the riser 40 is integral with one end of a second arm 42 which extends transversely of the top 20 adjacent the windshield 16 and substantially parallel to the arm 34.

The outer ends of the arms 34, 42 and 34', 42' are threaded and disposed in confronting aligned relation, respectively, to receive coupling sleeves 44, 46 for releasable connection, one to the other.

Adjacent the juncture of the riser 40 with the arm 42, the latter has fixedly secured thereto a suction cup 48 for releasable engagement against the top 20. Similarly, the arm 34 has a suction cup 50 secured thereto adjacent the extension member 36, the cup 50 being adapted for releasable connection with the cowling 18.

The arm 42 is connected with one end of an adjustable strap 52 whose other end terminates in a clip 54 which hooks under the upper frame member 26. In a similar manner, the arm 34 is connected, adjacent the extension member 38 to one end of a strap 56 terminating at its other end in a clip 58 engageable under the adjacent side of the hood 14.

The standards 38, 38' have connected thereto rear view side mirrors 60, 60' of conventional construction by the usual means 62, 62'.

The vacuum and strap connection means for connecting the support 28 to the vehicle 10 substantially eliminates vibrations from being imparted to the mirrors 60, 60' while at the same time provide a secure connection of the support to the vehicle.

From the foregoing description and the illustration of the rear view side mirror support it will be readily understood that the same may be rapidly connected to the vehicle and disconnected therefrom.

It will also be understood that the length of the component elements of the hollow tubular conduit supporting device may be varied, the various angles of inclination of the elements may be changed, and connecting means aside and apart from those specifically described herein may be utilized without departing from the spirit and scope of this invention.

Having described and illustrated one embodiment of this invention, it will be understood that the same is offered merely by way of example, and that this invention is to be limited only by the scope of the appended claims.

What is claimed is:

1. In combination, a vehicle body having a windshield, a top above the windshield, a cowl below the windshield, a hood forwardly of the cowl, and door frames at opposite sides of the windshield, an open frame positioned in front of and extending across the windshield and reaching at its ends laterally outwardly beyond related door frames, said open frame having upper and lower horizontal members severally located above and below the windshield, upper means securing the upper member to the body top, lower means securing the lower member to the cowl, said open frame having end portions, and rear-view mirrors severally mounted on said end portions.

2. In combination, a vehicle body having a windshield, a top above the windshield, a cowl below the windshield, a hood forwardly of the cowl, and door frames at opposite sides of the windshield, an open frame positioned in front of and extending across the windshield and reaching at its ends laterally outwardly beyond related door frames, said open frame having upper and lower horizontal members severally located above and below the windshield, upper means securing the upper member to the body top, lower means securing the lower member to the cowl, said open frame having end portions, and rear-view mirrors severally mounted on said end portions, said rear-view mirrors being positioned laterally inwardly of said end portions.

3. In combination, a vehicle body having a windshield, a top above the windshield, a cowl below the windshield, a hood forwardly of the cowl, and door frames at opposite sides of the windshield, an open frame positioned in front of and extending across the windshield and reaching at its ends laterally outwardly beyond related door frames, said open frame having upper and lower horizontal members severally located above and below the windshield, upper means securing the upper member to the body top, lower means securing the lower member to the cowl, said open frame having end portions, and rear-view mirrors severally mounted on said end portions, said open frame comprising a pair of similar substantially U-shaped sections having upper and lower horizontal arms having inner terminal end, and means severally coupling together the terminal ends of the upper and lower arms.

4. In combination, a vehicle body having a windshield, a top above the windshield, a cowl below the windshield, a hood forwardly of the cowl, and door frames at opposite sides of the windshield, an open frame positioned in front of and extending across the windshield and reaching at its ends laterally outwardly beyond related door frames, said open frame having upper and lower horizontal members severally located above and below the windshield, upper means securing the upper member to the body top, lower means securing the lower member to the cowl, said open frame having end portions, and rear-view mirrors severally mounted on said end portions, upper hooks on the upper member engaged with the door frames, and lower hooks on the lower member engaged under the hood.

References Cited in the file of this patent

UNITED STATES PATENTS

| | | |
|---|---|---|
| 1,274,130 | Winkelman | July 30, 1918 |
| 2,197,280 | Topping | Apr. 16, 1940 |
| 2,648,566 | Zeder et al. | Aug. 11, 1953 |
| 2,783,015 | Kampa | Feb. 26, 1957 |
| 2,807,985 | Beach | Oct. 1, 1957 |